United States Patent
Mizokami et al.

(10) Patent No.: US 11,360,234 B2
(45) Date of Patent: Jun. 14, 2022

(54) ELECTRODE DEVICE, SEMICONDUCTOR DEVICE, AND SEMICONDUCTOR SYSTEM

(71) Applicant: RENESAS ELECTRONICS CORPORATION, Tokyo (JP)

(72) Inventors: Takuya Mizokami, Tokyo (JP); Masahiro Araki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 161 days.

(21) Appl. No.: 16/831,070

(22) Filed: Mar. 26, 2020

(65) Prior Publication Data
US 2020/0341165 A1 Oct. 29, 2020

(30) Foreign Application Priority Data

Apr. 25, 2019 (JP) .............................. JP2019-083988

(51) Int. Cl.
*H01L 21/02* (2006.01)
*G01V 3/38* (2006.01)
*G08C 17/06* (2006.01)

(52) U.S. Cl.
CPC ............... *G01V 3/38* (2013.01); *G08C 17/06* (2013.01)

(58) Field of Classification Search
CPC .... G06F 3/0446; G06F 3/0445; G06F 3/0443; G06F 3/044; H03K 17/962; G01R 27/2605; G01R 27/26; G01R 27/2617; G01V 3/38; G08C 17/06
See application file for complete search history.

(56) References Cited

U.S. PATENT DOCUMENTS

| | | | |
|---|---|---|---|
| 9,543,947 B2 | 1/2017 | Araki | |
| 2014/0354596 A1* | 12/2014 | Djordjev | G06F 3/0421 345/175 |
| 2015/0123931 A1* | 5/2015 | Kitchens | G06F 3/0436 345/174 |
| 2016/0062480 A1* | 3/2016 | Ogawa | G06F 3/0393 345/156 |

FOREIGN PATENT DOCUMENTS

JP 2017-204900 A 11/2017

* cited by examiner

*Primary Examiner* — Alesa Allgood
(74) *Attorney, Agent, or Firm* — McDermott Will & Emery LLP

(57) ABSTRACT

The present invention provides an electrode device, semiconductor device and a semiconductor system capable of accuracy detecting an object to be detected. According to one embodiment, the electrode device 11 is used for detecting the capacitance of the mutual capacitance system, and includes a reception electrode PR1, a transmission electrode PX1 arranged to face the reception electrode PR1, a transmission electrode PX2 arranged to face the reception electrode PR1 with the transmission electrode PX1 interposed therebetween, and a dielectric board 101 provided between the transmission electrode PX1 and the transmission electrode PX2 to fix the distance and the dielectric constant between the transmission electrode PX1 and the transmission electrode PX2.

18 Claims, 11 Drawing Sheets

ELECTRODE DEVICE, SEMICONDUCTOR DEVICE, AND SEMICONDUCTOR SYSTEM

CROSS-REFERENCE TO RELATED APPLICATIONS

The disclosure of Japanese Patent Application No. 2019-083988 filed on Apr. 25, 2019 including the specification, drawings and abstract is incorporated herein by reference in its entirety.

BACKGROUND

The present invention relates to electrode device, semiconductor device and semiconductor system, for example, the present invention relates to electrode device, semiconductor device and semiconductor system suitable for accuracy detecting object to be detected.

In recent years, it has been demanded to accurately detect that an object to be detected (detection target object) such as paper is inserted between electrodes or a touching electrode by an object to be detected such as a finger by using a sensor of mutual capacitance type. For example, Patent Document 1 discloses a configuration of a touch sensor of mutual capacitance type for detecting whether or not touch electrodes are touched by fingers.

There is disclosed techniques listed below.
[Patent Document 1] Japanese Unexamined Patent Application Publication 2017-204900

SUMMARY

However, in the configuration of the related art, when the distance between the electrodes unintentionally varies due to slight vibrations or the like, unintentional numerical value fluctuations occur regardless of the presence or absence of object to be detected or at the time detecting the object to be detected, and there is a possibility that erroneous detection or detection errors may occur. That is, in the configuration of the related art, it is still impossible to accurately detect the object to be detected. Other problems and novel features will become apparent from the description of this specification and the accompanying drawings.

According to one embodiment, the electrode device is used for detecting a capacitance of a mutual capacitance type, comprises: a receiver electrode; a first transmitter electrode disposed opposite to the receiver electrode; a second transmitter electrode disposed opposite to the receiver electrode with the first transmitter electrode interposed therebetween; and a dielectric substrate disposed between the first transmitter electrode and the second transmitter electrode for fixing distance and dielectric constant between the first transmitter electrode and the second transmitter electrode.

According to one embodiment, a semiconductor device includes a receiver electrode, a first transmitter electrode disposed opposite to the receiver electrode, a second transmitter electrode disposed opposite to the receiver electrode with the first transmitter electrode interposed between the receiver electrode, a dielectric substrate provided between the first transmitter electrode and the second transmitter electrode for fixing a distance and a dielectric constant between the first transmitter electrode and the second transmitter electrode, a pulse signal output circuit for selectively outputting a pulse signal to any of the first transmitter electrode and the second transmitter electrode of an electrode device, a capacitance detection circuit for calculating a change in capacitance between the first transmitter electrode and the receiver electrode by using a current consumed in the receiver electrode when the pulse signal is applied to the first transmitter electrode and a current consumed in the receiver electrode when the pulse signal is applied to only the second transmitter electrode, an arithmetic processing unit for determining whether or not a detection target object is disposed in the electrode device on the basis of a detection result by the capacitance detection circuit.

According to one embodiment, a semiconductor system includes an electrode device and a semiconductor device, wherein the electrode device includes a receiver electrode, a first transmitter electrode disposed to face the receiver electrode, a second transmitter electrode disposed to face the receiver electrode with the first transmitter electrode sandwiched between the receiver electrode, and a dielectric substrate provided between the first transmitter electrode and the second transmitter electrode to fix the distance and dielectric constant between the first transmitter electrode and the second transmitter electrode, and wherein the semiconductor device includes a pulse signal output circuit for selectively outputting a pulse signal to one of the first transmitter electrode and the second transmitter electrode, a capacitance detection circuit for calculating a capacitance change amount between the first transmitter electrode and the receiver electrode by using a current consumed in the receiver electrode when the pulse signal is applied to the first transmitter electrode, and a current consumed in the receiver electrode when the pulse signal is applied to only the second transmitter electrode, and an arithmetic processing unit that determines whether or not an object to be detected is disposed on the electrode device, based on the detection result by the capacitance detection circuit.

Effect of the Invention

According to the above-mentioned embodiment, it is possible to provide electrode device, semiconductor device and semiconductor system capable of detecting object to be detected with high accuracy.

DETAILED DESCRIPTION

Figure 1:
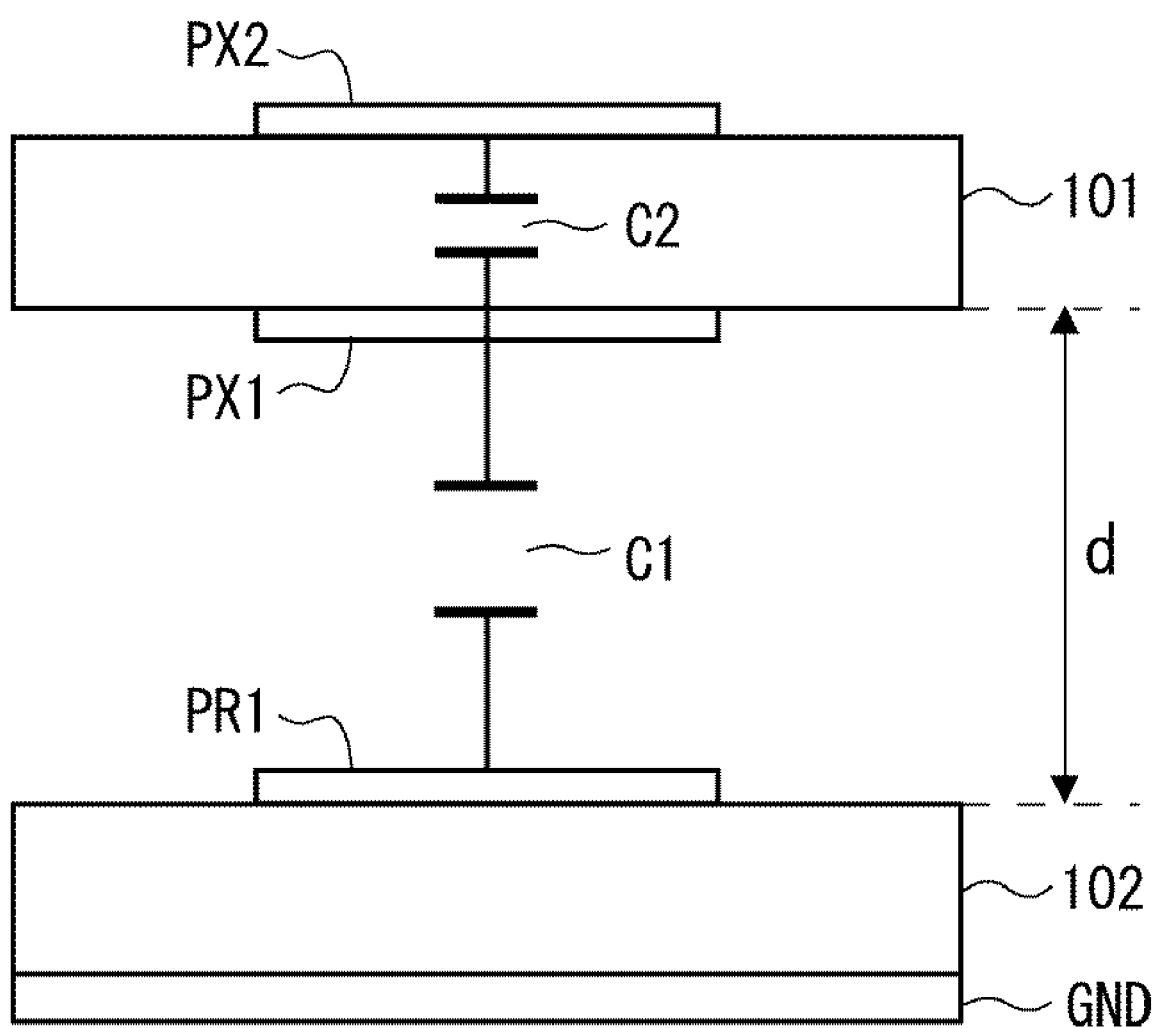
FIG. 1 is a schematic cross-sectional view showing an exemplary configuration of an electrode device according to a first embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Figure 9:
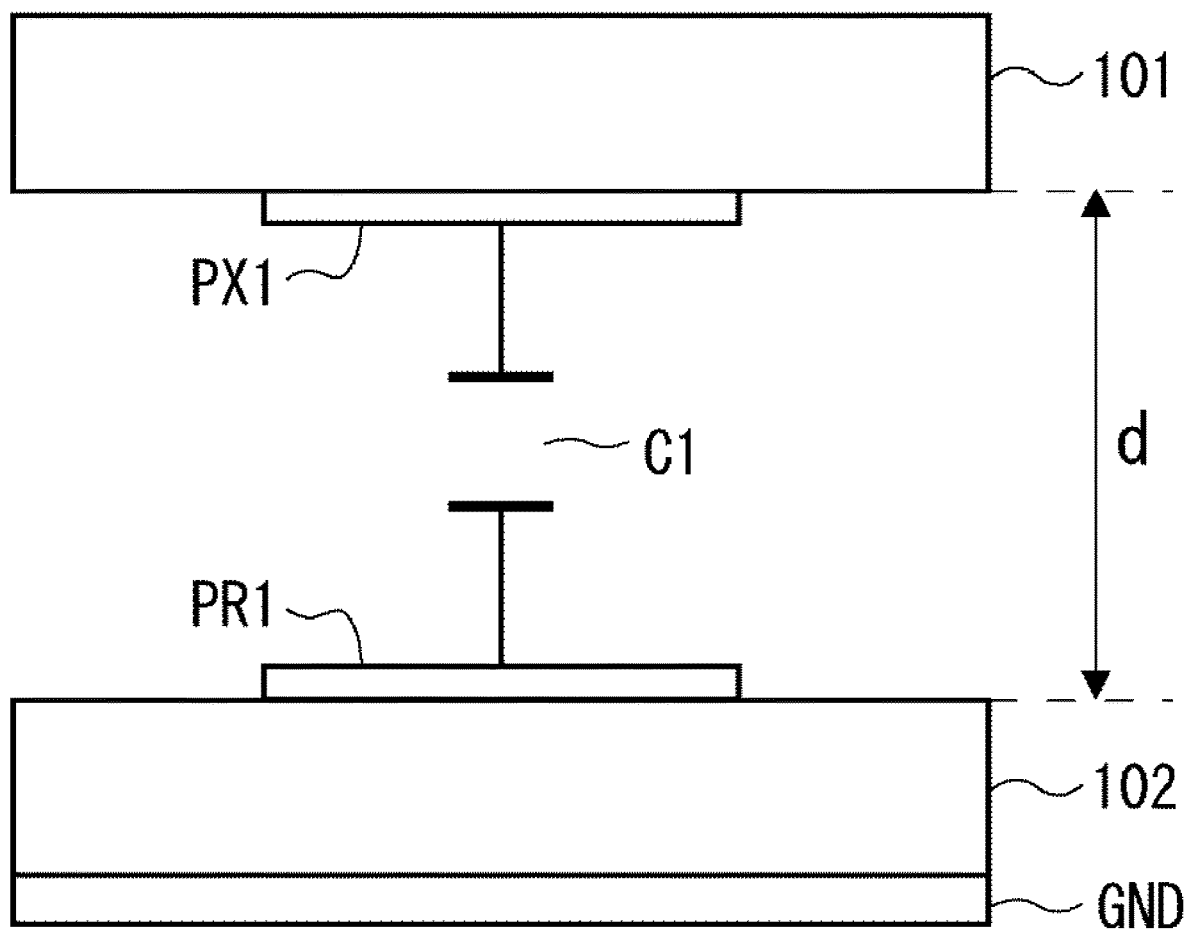
FIG. 9 is a schematic cross-sectional view showing a configuration example of an electrode device according to the previous concept leading to the first embodiment.

First, with reference to FIG. 9, the electrode device 60 which has been examined in advance by the present inventor will be described. FIG. 9 is a schematic cross-sectional view showing an exemplary configuration of the electrode device 60 according to the concept prior to the first embodiment.

The electrode device 60 is used to detect the capacitance of the mutual capacitance type and changes the capacitance between the electrodes by inserting an object to be detected, such as paper, between the electrodes. The sensor using the electrode device 60 detects whether or not an object to be detected such as paper has been inserted between the electrodes on the basis of the variation of the capacitance obtained from the electrode device 60. Hereafter, a concrete description will be given.

As shown in FIG. 9, the electrode device 60 includes a transmitter electrode PX1, a receiver electrode PR1, and dielectric substrate 101 and 102.

Specifically, the transmitter electrode PX1 is disposed on the main surface of the dielectric substrate 101. The receiver electrode PR1 is disposed on the main surface of the dielectric substrate 102 disposed to face the dielectric substrate 101 so as to face the transmitter electrode PX1 with a predetermined distance d therebetween. The dielectric substrates 101 and 102 are, for example, glass-epoxy substrates.

An electrostatic capacitance C1 is formed between the transmitter electrode PX1 and the receiver electrode PR1.

In FIG. 9, a space area into which an object to be detected such as paper can be inserted is formed between the transmitter electrode PX1 and the receiver electrode PR1. Hereinafter, the case where the object to be detected is the paper (sheet) P1 will be exemplified.

Figure 10:
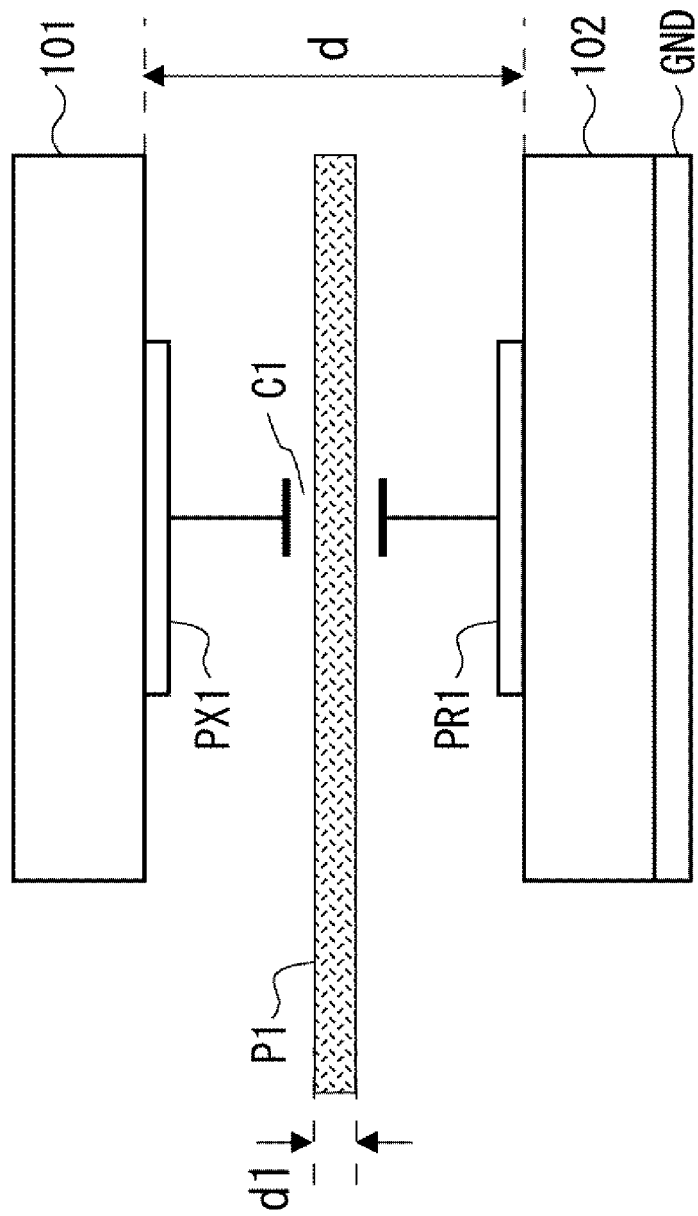
FIG. 10 is a schematic cross-sectional view showing a state in which a paper is inserted between the electrodes of electrode device shown in FIG. 9.

FIG. 10 is a schematic cross-sectional view showing a condition in which the paper P1 is inserted between the electrodes PX1 and PR1 of the electrode device 60. As shown in FIG. 10, if the thickness of the paper is d1 (<d), the paper P1 differing in dielectric constant from air is inserted in the area corresponding to the thickness d1 in the space area of the distance d between the electrodes PX1, PR1 instead of air.

Figure 11:
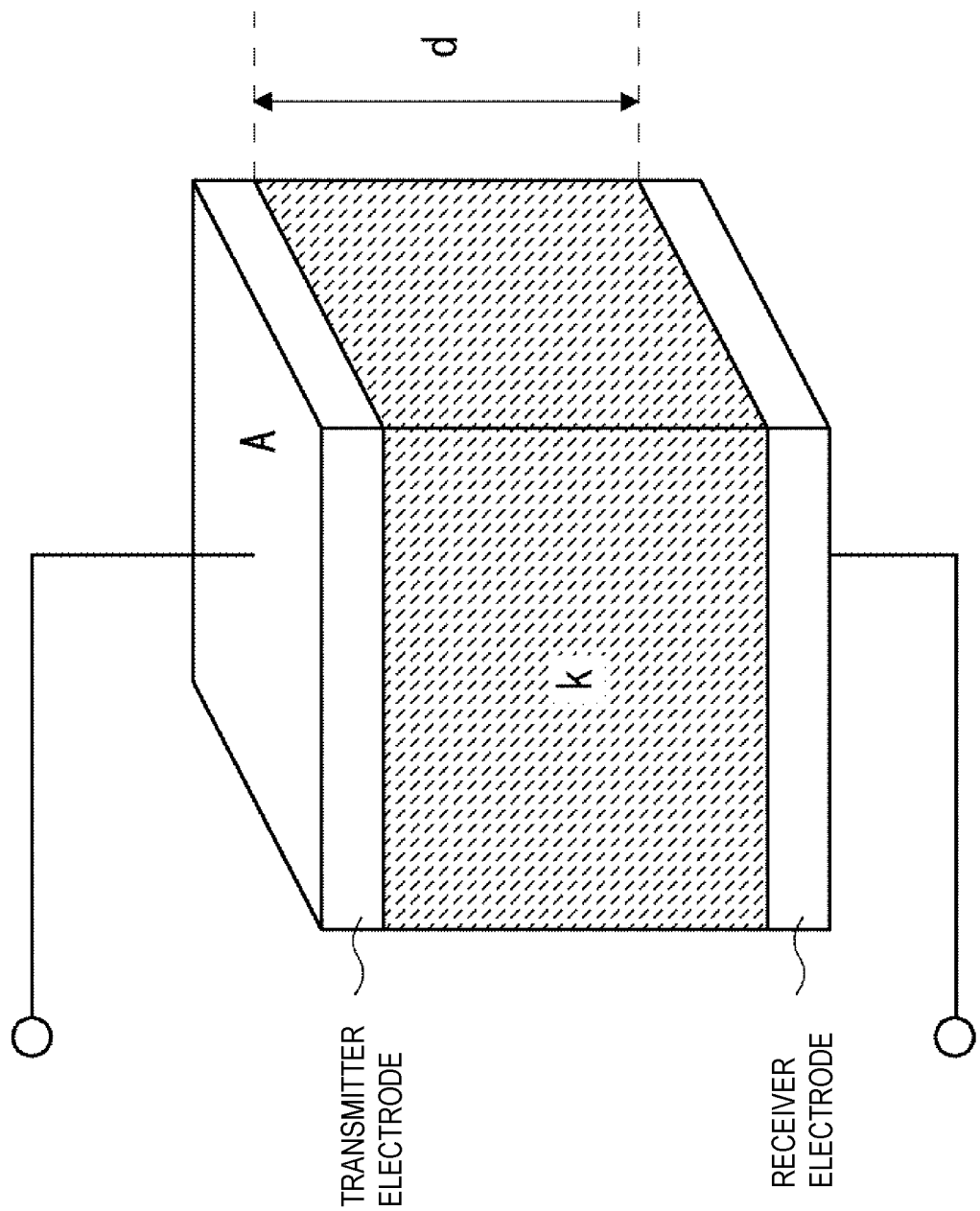
FIG. 11 is a diagram for explaining a capacitance formed between the electrodes.

Referring now to FIG. 11, the capacitance of the capacitance C generated between the electrodes is generally expressed by the following equation (1). Where C is the capacitance value of electrostatic capacitance (electric capacity, electrostatic capacity, capacitance) C, d is the inter-electrode distance, k is the relative permittivity of inter-electrode area, A is the electrode area, and ε0 is the electric constant.

$$C = k \times \varepsilon 0 \times A/d \tag{1}$$

As can be seen from equation (1), capacitance C is proportional to the electrode area A, proportional to the relative permittivity k of the inter-electrode area and inversely proportional to the inter-electrode distance d.

Therefore, the capacitance value of the electrostatic capacitance C1 changes when the paper P1 with different dielectric constant from air is inserted between the electrodes. The sensor using the electrode device 60 can detect whether or not the paper P1 is inserted between the electrodes based on the amount of change in the capacitance.

Here, assuming that the thickness of the paper P1 is 90 μm and the dielectric constant of the paper P1 is twice the dielectric constant of the air, the change in the capacitance value of the capacitance C1 due to the paper P1 being inserted between the electrodes is equivalent to the change in the capacitance value of the capacitance C1 when the distance d between the electrodes is shortened by 45 μm. Therefore, if the distance d between the electrodes unintentionally fluctuates due to slight vibrations or the like, the sensor using the electrode device 60 may erroneously detect that the paper P1 has been inserted between the electrodes.

Therefore, an electrode device 11, a control device (semiconductor device) 12, and a sensor system (semiconductor system) SYS1 according to the first embodiment, which can solve such problems, have been found.

First Embodiment

FIG. 1 is a schematic cross-sectional view showing a configuration example of an electrode device 11 according to a first embodiment. The electrode device 11 is used to detect the capacitance of the mutual capacitance type, and changes the capacitance between the electrodes by inserting an object to be detected such as paper between the electrodes. A sensor (control device 12 described later) using the electrode device 11 detects whether or not an object to be detected such as paper has been inserted between the electrodes based on a change in capacitance obtained from the electrode device 11. Hereafter, a concrete description will be given.

As shown in FIG. 1, the electrode device 11 includes two transmitter electrode PX1 and PX2, a receiver electrode PR1, and dielectric substrates 101 and 102.

Specifically, the transmitter electrode PX1 is disposed on one main surface of the dielectric substrate 101, and the transmitter electrode PX2 is disposed on the other main surface of the dielectric substrate 101. The receiver electrode PR1 is disposed on the main surface of the dielectric substrate 102 disposed to face the dielectric substrate 101 so as to face the transmitter electrode PX1 with a predetermined distance d therebetween, and is disposed to face the transmitter electrode PX2 with the transmitter electrode PX1 and the dielectric substrate 101 interposed therebetween. The dielectric substrate 101 and 102 are, for example, glass-epoxy substrates.

A capacitance C1 is formed between the transmitter electrode PX1 and the receiver electrode PR1. A capacitance C2 is formed between the transmitter electrode PX1 and PX2.

In the embodiment shown in FIG. 1, a space area into which an object to be detected such as paper can be inserted is formed between the transmitter electrode PX1 and the receiver electrode PR1. Hereinafter, the case where the object to be detected is the paper P1 will be exemplified.

On the other hand, a dielectric substrate 102 is provided between the transmitter electrode PX1 and the PX2. Therefore, distance and dielectric constant between transmitter electrode PX1 and PX2 are fixed.

Calculation method of electrostatic capacitance C1

Next, a method of calculating capacitance value of the electrostatic capacitance C1 of the electrode device 11 will be described. Here, the case where the capacitance value of the capacitance C1 of the electrode device 11 is calculated by converting the capacitance value into the distance d between the transmitter electrode PX1 and the receiver electrode PR1 will be described.

First, when the capacitance value of the capacitance C1 between the transmitter electrode PX1 and the receiver electrode PR1 is Ca, and the capacitance value of the capacitance between the transmitter electrode PX2 and the receiver electrode PR1 is Cb, the following equations (2) and (3) hold. However, when electric field is generated between the electrodes PX1 and PR1 (i.e., when voltages are applied between the electrodes PX1 and PR1), the transmitter electrode PX2 is set to a HiZ (high-impedance state). When electric field is generated between the electrodes PX2 and PR1 (i.e., when voltages are applied between the electrodes PX2 and PR1), the transmitter electrode PX1 is set to the HiZ state.

Equation 1

$$\frac{1}{Ca} = \frac{1}{C1} \qquad (2)$$

Equation 2

$$\frac{1}{Cb} = \frac{1}{C1} + \frac{1}{C2} \qquad (3)$$

If I is consumption current (the current value of the current I1 described later), F is the operating frequency (the oscillation frequency of the clock signal CLK1 described later), C is the capacitance value, and V is the inter-electrode voltage, I=FCV is established. Therefore, the consumption current I1a when electric field is generated between the electrodes PX1 and PR1 is expressed by the following equation (4) from the equation (2). When electric field is generated between the electrodes PX2 and PR1, the consumption current I1b is expressed by the following equation (5) from the equation (3).

$$I1a = F \cdot C1 \cdot V \qquad (4)$$

Equation 3

$$I1b = F \cdot \frac{C1 \cdot C2}{C1 + C2} \cdot V \qquad (5)$$

From the equations (4) and (5), the following equation (6) holds.

Equation 4

$$\frac{1}{C1} \cdot I1a = \frac{1}{\left(\frac{C1 \cdot C2}{C1 + C2}\right)} \cdot I1b \qquad (6)$$

When the equation (6) is transformed, it is expressed as the equation (7).

Equation 5

$$I1a \cdot \left(\frac{C1 \cdot C2}{C1 + C2}\right) = I1b \cdot C1$$

Equation 6

$$I1a \cdot \left(\frac{C2}{C1 + C2}\right) = I1b$$

$$I1a \cdot C2 = I1b \cdot (C1 + C2)$$

$$I1a \cdot C2 = I1b \cdot C1 + I1b \cdot C2$$

$$(I1a - I1b)C2 = I1b \cdot C1$$

Equation 7

$$C1 = \frac{(I1a - I1b)}{I1b} \cdot C2 \qquad (7)$$

Here,

[Equation 8]

$$C1 = \varepsilon 0 \cdot \varepsilon r \cdot \frac{S}{d}$$

distance d is expressed by the following equation (8). Here, ε0 represents an electric constant, εr represents relative permittivity of an inter-electrode area, S represents an electrode area, and d represents an inter-electrode distance.

Equation 9

$$d = \left(\frac{\varepsilon 0 \cdot \varepsilon r \cdot S}{C1}\right)$$

Equation 10

$$d = \frac{\varepsilon 0 \cdot \varepsilon r \cdot S}{\frac{(I1a - I1b)}{I1b} \cdot C2}$$

-continued

Equation 11

$$d = \frac{\varepsilon 0 \cdot \varepsilon r \cdot S \cdot I1b}{(I1a - I1b) \cdot C2} \quad (8)$$

From ε=1, distance d is expressed by the following equation (9).

Equation 12

$$d = \frac{\varepsilon 0 \cdot S \cdot I1b}{(I1a - I1b) \cdot C2} \quad (9)$$

As can be understood from the equation (9), the distance d can be calculated by measuring the current value I1a and the current value I1b. The change in the capacitance value of the electrostatic capacitance C1 becomes clear from the change in the calculation result of the distance d. That is, from the change in the calculation result of the distance d, the amount of change in the capacitance value of the electrostatic capacitance C1, which changes as the paper P1 is inserted between the electrodes PX1 and PR1, can be obtained. Therefore, the sensor using the electrode device 11 can accurately detect whether or not the paper P1 is inserted between the electrodes PX1 and PR1 based on the calculation result of the distance d. The sensor using the electrode device 11 can also determine the material of the paper P1 inserted between the electrodes PX1 and PR1 in accordance with the improvement of the detecting accuracy.

Explanation of the Sensor System SYS1 With the Electrode Device 11

Figure 2:
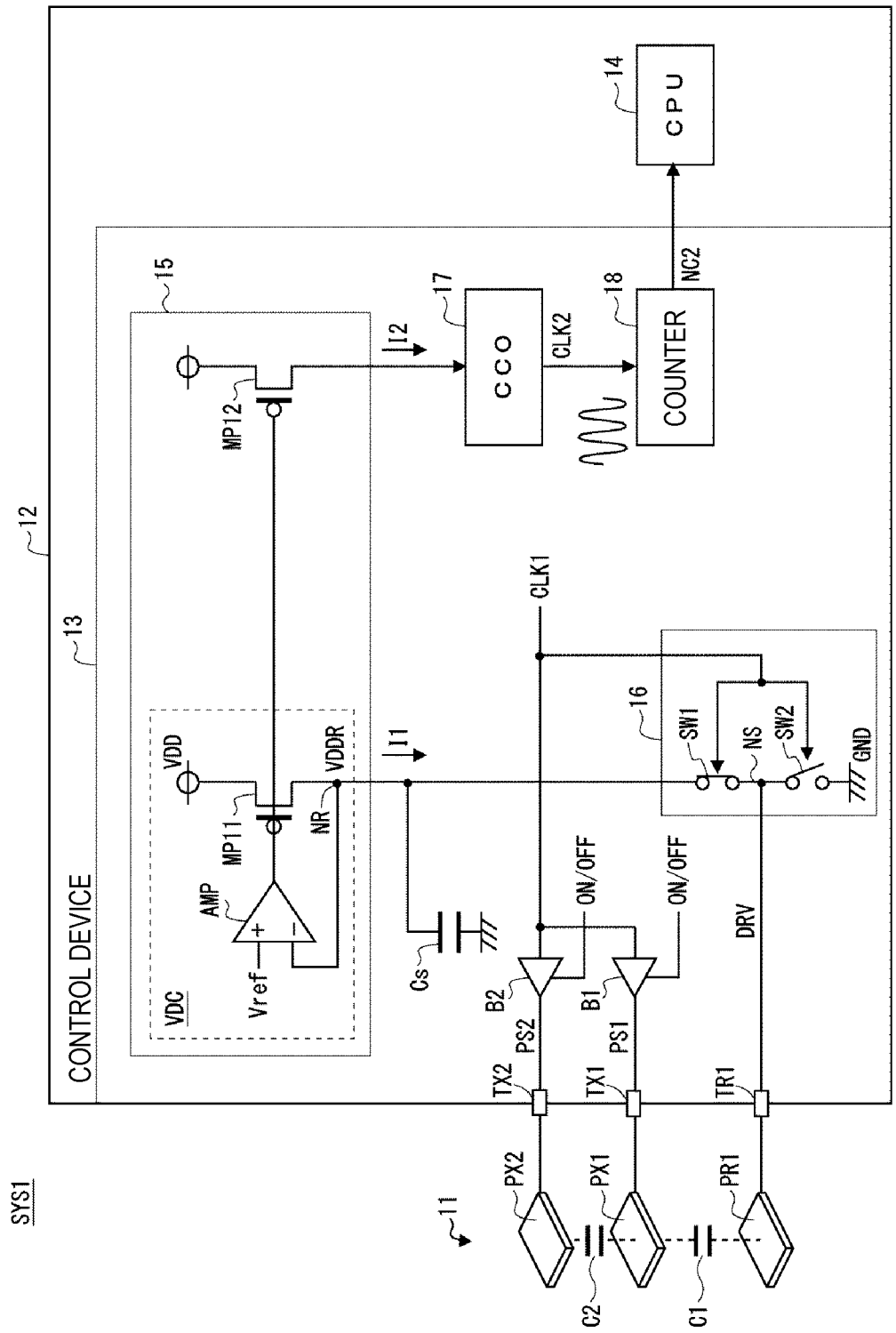
FIG. 2 is a diagram showing an exemplary configuration of a semiconductor device including the electrode device shown in FIG. 1.

Subsequently, FIG. 2 is used to describe the sensor system with the electrode device 11. FIG. 2 is a diagram showing an exemplary configuration of a sensor system (semiconductor system) SYS1 including the electrode device 11.

As shown in FIG. 2, the sensor system SYS1 includes an electrode device 11 and a control device (semiconductor device) 12. The control device 12 is a so-called microcomputer, and has a function as a sensor for detecting whether or not the paper P1 is inserted between the electrodes of the electrode device 11 based on the variation of the electrostatic capacitance C1 detected from the electrode device 11. Further, the control device 12 may have a function as a sensor for specifying the material of the inserted paper P1 based on the absolute capacitance value of the electrostatic capacitance C1 detected from the electrode device 11.

Specifically, the control device 12 includes a capacitance detection unit 13, an arithmetic processing unit (CPU) 14, and a terminals TX1, TX2, and TR1. The capacitance detection unit 13 includes a current mirror 15, a switch circuit 16, a current-controlled oscillation circuit (CCO; Current Controlled Oscillator) 17, a counter 18, buffers B1 and B2, and a smoothing capacitor Cs. The buffers B1 and B2 constitute a pulse signal output circuit. Among the components of the capacitance detection unit 13, the capacitance detection circuit is configured by components other than the pulse signal output circuit.

The transmitter electrode PX2 of the electrode device 11 is connected to the terminal TX1. The transmitter electrode PX1 of the electrode device 11 is connected to the terminal TX2. The receiver electrode PR1 of the electrode device 11 is connected to the terminal TR1.

The power supply voltage dropping circuit VDC includes a P-channel MOS transistor MP11 (hereinafter called just "transistor") and an amplifier AMP. In the transistor MP11, the source is connected to the power supply voltage terminal VDD, the drain is connected to the node NR, and the gate is applied with the output voltage of the amplifier AMP. The amplifier AMP amplifies a potential difference between the voltage VDDR of the node NR and the reference voltage Vref, and applies the amplified voltage to the gate of the transistor MP11. That is, the amplifier AMP controls the gate voltage of the transistor MP11 so that VDDR, the voltage of the node NR, becomes equal to the reference voltage Vref.

In the transistor MP12, the source is connected to the power supply voltage terminal VDD, and the output voltage of the amplifier AMP is applied to the gate. That is, the transistors MP11 and MP12 constitute a current mirror circuit. Therefore, a current I2 proportional to the current I1 flowing between the source and the drain of the transistor MP11 flows between the source and the drain of the transistor MP12. The current driving capability (transistor size) of each transistor MP11 and MP12 is set to an arbitrary value in accordance with design specification.

The switch circuit 16 has a switching elements SW1 and SW2. The switch device SW1 is provided between the node NR and the node NS, and switches on and off based on the clock signal CLK1. The switch element SW2 is provided between the node NS and the ground-voltage terminal GND, and switches on and off complementarily to the switch element SW1 based on the clock signal CLK1. The node NS is connected to the terminal TR1.

For example, when the clock signal CLK1 is at L (low) level, the switch element SW1 is turned on and the switch element SW2 is turned off. Therefore, the voltage VDDR of the node NR is applied to the terminal TR1. That is, the voltage VDDR of the node NR is applied to the receiver electrode PR1 via the terminal TR1. As a result, charges are accumulated in the receiver electrode PR1.

On the other hand, when the clock signal CLK1 is at the H (high) level, the switch element SW1 is turned off and the switch element SW2 is turned on. Therefore, the ground voltage (ground potential) GND is applied to the terminal TR1. That is, the ground voltage GND is applied to the receiver electrode PR1 via the terminal TR1. As a result, the charges accumulated in the receiver electrode PR1 are discharged.

That is, the switch circuit 16 generates the driving pulses DRV obtained by inverting the logical levels of the clock signal CLK1, and applies the driving pulse DRV to the receiver electrode PR1 through the terminal TR1.

The buffer B1 is a so-called tri-state buffer, and switches whether to output the clock signal CLK1 as the pulse signal PS1 or to set the output to the HiZ state. The buffer B2 is a so-called tri-state buffer, and switches the output of the clock signal CLK1 as the pulse signal PS2 or the output of the buffer B2 to the HiZ state in a manner complementary to that of the buffer B1.

For example, when buffer B1 outputs clock signal CLK1 as pulse signal PS1, the output of buffer B2 is set to HiZ state. As a result, the pulse signal PS1 is applied to the transmitter electrode PX1. On the other hand, transmitter electrode PX2 is set to HiZ state. At this time, the driving pulse DRV are applied to the receiver electrode PR1. Therefore, electric field occurs between the transmitter electrode PX1 and the receiver electrode PR1.

On the other hand, when the buffer B2 outputs the clock signal CLK1 as the pulse signal PS2, the output of the buffer B1 is set to the HiZ state. As a result, the pulse signal PS2 is applied to the transmitter electrode PX2. On the other hand, transmitter electrode PX1 is set to HiZ state. At this time, the driving pulse DRV are applied to the receiver electrode PR1. Therefore, electric field occurs between the transmitter electrode PX2 and the receiver electrode PR1.

The current mirror circuit 15 includes a power supply voltage drop circuit (constant voltage generation circuit) VDC and a P-channel MOS transistor (hereinafter, simply referred to as a transistor) MP12. The power supply voltage drop circuit VDC generates a voltage VDDR at the node NR, which is obtained by stepping down the power supply voltage VDD. The smoothing capacitor Cs is provided between the node NR and the ground voltage terminal GND, and smooths the charge current waveform generated by the switched capacitor filter (Switched Capacitor Filter) of the switch circuit 16 in accordance with the detected capacitance, and sends the smoothed charge current waveform to the current-controlled oscillation circuit 17.

The current-controlled oscillation circuit 17 outputs a clock signal CLK2 having a frequency corresponding to the current proportional to the current I1. The current-controlled oscillation circuit 17 includes a ring oscillator and a buffer circuit. In the ring oscillator, a plurality of inverter circuits whose delay times vary according to the current I2 are connected in a ring shape. The buffer circuit amplifies the outputs of the inverter circuits in the final stages of the plurality of inverter circuits and outputs the amplified outputs as clock signal CLK2. The counter 18 counts the number of oscillations of the clock signal CLK2 per predetermined period, and outputs a count value NC2.

For example, as the value of the current I2 increases, the delay times of the inverters provided in the current-controlled oscillation circuit 17 decrease, so that the frequency of the clock signal CLK2 increases, and as a result, the count value NC2 increases. On the other hand, when the value of the current I2 decreases, the delay times of the inverters provided in the current-controlled oscillation circuit 17 increase, so that the frequency of the clock signal CLK2 decreases, and as a result, the count value NC2 decreases.

The arithmetic processing unit 14 calculates the value of the current I1 based on the count value NC2 at this time. Specifically, the arithmetic processing unit 14 calculates the value (I1a) of the current I1 when electric field is generated between the electrodes PX1, PR1 and the value (I1b) of the current I1 when electric field is generated between the electrodes PX2, PR1. The arithmetic processing unit 14 calculates the distance d by substituting the calculation results of the current values I1a and I1b into the above equation (9). Here, from the change in the calculation result of the distance d, the change in the capacitance value of the electrostatic capacitance C1 becomes clear. Therefore, the arithmetic processing unit 14 can calculate the amount of change in the capacitance value of the electrostatic capacitance C1, which changes as the paper P1 is inserted between the electrodes PX1 and PR1, from the amount of change in the calculation result of the distance d. That is, the arithmetic processing unit 14 can accurately detect whether or not the paper P1 is inserted between the electrodes PX1 and PR1 from the calculation result of the distance d. The arithmetic processing unit 14 can also determine the material of the paper P1 inserted between the electrodes PX1 and PR1 from the calculation result of the distance d.

Sensor System SYS1 Operation

Next, the operation of the sensor system SYS1 is explained.

First, the sensor system SYS1 measures the value of the current I1 (i.e., the current value I1a) when electric field is generated between the transmitter electrode PX1 and the receiver electrode PR1 provided in the electrode device 11.

At this time, the buffer B1 outputs the clock signal CLK1 as the pulse signal PS1, and the buffer B2 sets the output to the HiZ state. As a result, the pulse signal PS1 is applied to the transmitter electrode PX1. On the other hand, transmitter electrode PX2 is set to HiZ state. At this time, the switch circuit 16 outputs the driving pulse DRV obtained by inverting the logical levels of the clock signal CLK1. As a result, the driving pulse DRV are applied to the receiver electrode PR1. Therefore, electric field occurs between the transmitter electrode PX1 and the receiver electrode PR1.

The change in the electrostatic capacitance C1 caused by the paper P1 being inserted between the transmitter electrode PX1 and the receiver electrode PR1 appears as a change in the integrated value of the current I1 (I1a).

The current-controlled oscillation circuit 17 outputs a clock signal CLK2 having a frequency corresponding to the current I2 proportional to the current I1. The counter 18 counts the number of oscillations of the clock signal CLK2 per predetermined period, and outputs a count value NC2.

The arithmetic processing unit 14 calculates the value of the current I1 (i.e., the current value I1a) when electric field is generated between the transmitter electrode PX1 and the receiver electrode PR1 based on the count value NC2 at this time.

Next, the sensor system SYS1 measures the value of the current I1 (i.e., the current value I1b) when electric field is generated between the transmitter electrode PX2 and the receiver electrode PR1 provided in the electrode device 11.

At this time, the buffer B1 sets the output to the HiZ state, and the buffer B2 outputs the clock signal CLK1 as the pulse signal PS2. The transmitter electrode PX1 is thereby set to the HiZ state. On the other hand, pulse signal PS2 is applied to transmitter electrode PX2. At this time, the switch circuit 16 outputs the driving pulse DRV obtained by inverting the logical levels of the clock signal CLK1. As a result, the driving pulse DRV are applied to the receiver electrode PR1. Therefore, electric field occurs between the transmitter electrode PX2 and the receiver electrode PR1.

The change in the electrostatic capacitance C2 caused by the paper P1 being inserted between the transmitter electrode PX1 and the receiver electrode PR1 appears as a change in the integrated value of the current I1 (I1b).

The current-controlled oscillation circuit 17 outputs a clock signal CLK2 having a frequency corresponding to the current I2 proportional to the current I1. The counter 18 counts the number of oscillations of the clock signal CLK2 per predetermined period, and outputs a count value NC2.

The arithmetic processing unit 14 calculates the value of the current I1 (i.e., the current value I1b) when electric field is generated between the transmitter electrode PX2 and the receiver electrode PR1 based on the count value NC2 at this time.

Thereafter, the arithmetic processing unit 14 calculates the distance d by substituting the calculation results of the current values I1a and I1b into the above equation (9). Here, from the change in the calculation result of the distance d, the change in the capacitance value of the electrostatic capacitance C1 becomes clear. Therefore, the arithmetic processing unit 14 can calculate the amount of change in the capacitance value of the electrostatic capacitance C1, which changes as the paper P1 is inserted between the electrodes PX1 and PR1, from the amount of change in the calculation result of the distance d. That is, the arithmetic processing unit 14 can accurately detect whether or not the paper P1 is inserted between the electrodes PX1 and PR1 from the calculation result of the distance d. The arithmetic processing unit 14 can also determine the material of the paper P1 inserted between the electrodes PX1 and PR1 in accordance with the improvement of the detecting accuracy.

As described above, the electrode device 11 according to the present embodiment includes the receiver electrode PR1, the transmitter electrodes PX1 and PX2 arranged to face the receiver electrode PR1, and the dielectric substrate 101 provided between the transmitter electrodes PX1 and PX2. Then, the sensor system SYS1 calculates the amount of change in the capacitance value of the electrostatic capacitance C1 based on the consumption current value I1a when electric field is generated between the electrodes PX1, PR1 and the consumption current value I1b when electric field is generated between the electrodes PX2, PR1. As a result, the sensor system SYS1 can accurately detect whether or not the paper P1 is inserted between the electrodes PX1 and PR1. The control device 12 can also determine the material of the paper P1 inserted between the electrodes PX1 and PR1 in accordance with the improvement of the detecting accuracy.

In the present embodiment, the pulse signal applied to the transmitter electrodes PX1 and PX2, and the driving pulse DRV applied to the receiver electrode PR1 have opposite phases, but the present invention is not limited thereto. The pulse signal applied to the transmitter electrodes PX1 and the PX2 and the drive pulse DRV applied to the receiver electrode PR1 may be in phase with each other. Alternatively, the difference between the current value I1a in each of the reversed phase and the in-phase and the difference between the current value I1b in each of the reversed phase and the in-phase may be used to measure the amount of change in the capacitance value of the electrostatic capacitance C1. As a result, idle current components caused by external components (such as parasitic capacitances) other than between the transmitter and receiver electrodes included in each of the currents I1a and I1b are canceled out, so that the measurement accuracy of the amount of change in the capacitance values of the electrostatic capacitances C1 and C2 only between the transmitter electrodes PX1, PX2 and the receiver electrode PR1 is improved.

In present embodiment, the case where the output of the buffer B2 is set to the HiZ state when the buffer B1 is outputting the pulse signal PS1 has been described, but the present invention is not limited to this case. When the buffer B1 is outputting the pulse signal PS1, the buffer B2 may be outputting the pulse signal PS2 in phase with the pulse signal PS1. At this time, since the potential difference between the electrodes PX1, PX2 becomes substantially 0V, the interferences of the electric field generated between the electrodes PX1, PR1 and the electric field generated between the electrodes PX1, PX2 are suppressed to a negligible degree.

In the present embodiment, the case where the control device 12 measures the consumption current value when electric field is generated between the electrodes PX1, PR1 and the consumption current value when electric field is generated between the electrodes PX2, PR1, and calculates the amount of change in the capacitance value of the electrostatic capacitance C1 from the measurement result has been described as an example, but the present invention is not limited to this example. For example, the control device 12 may be configured to measure the inter-electrode voltage when electric field is generated between the electrodes PX1, PR1 and the inter-electrode voltage when electric field is generated between the electrodes PX2, PR1, and calculate the amount of change in the capacitance value of the electrostatic capacitance C1 from the measurement result.

Further, in the present embodiment, the control device 12 detects whether the paper P1 is inserted between the electrodes PX1 and PR1 of the electrode device 11, but the present invention is not limited thereto. The control device 12 may also detect touches to the electrode PX1 or electrode PR1 that cause variations in the distance d between the electrodes PX1 and PR1 of the electrode device 11.

Second Embodiment

Figure 3:
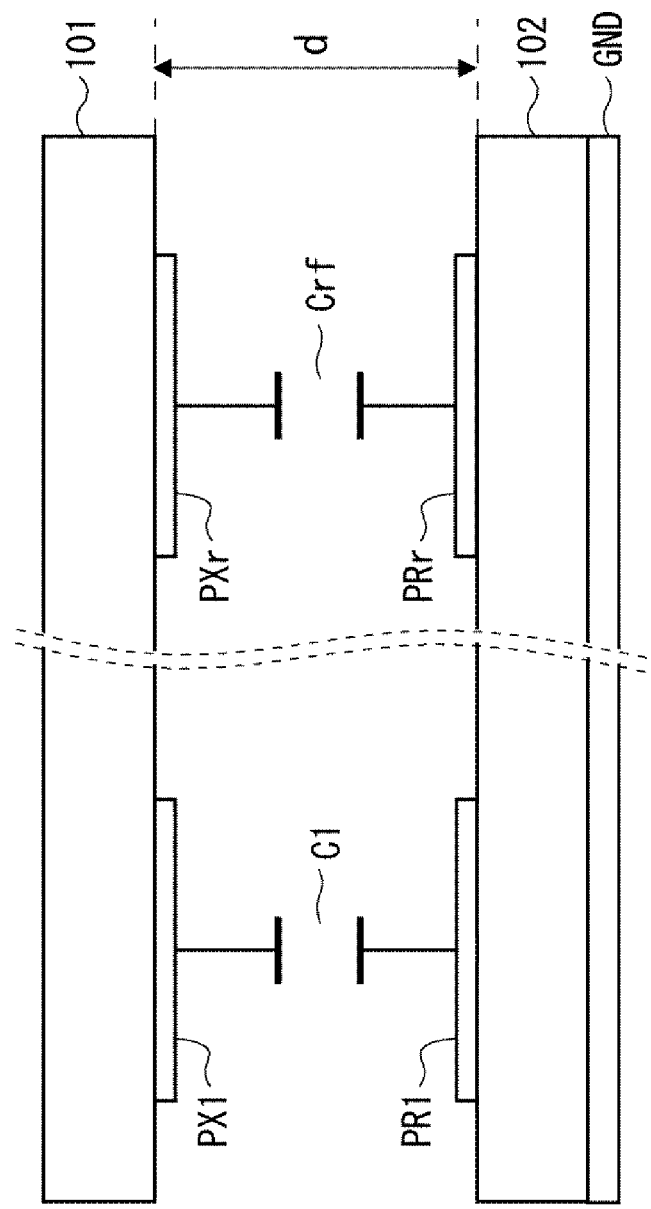
FIG. 3 is a schematic cross-sectional view showing an exemplary configuration of an electrode device according to a second embodiment.

FIG. 3 is a cross-sectional schematic view showing a configuration example of an electrode device 21 according to the second embodiment. The electrode device 21 further comprises a pair of reference electrodes constituted by transmitter electrode PXr and receiver electrode PRr as compared with the electrode device 60. Hereafter, a concrete description will be given.

As shown in FIG. 3, the electrode device 21 includes transmitter electrode PX1, receiver electrode PR1, transmitter electrode PXr, receiver electrode PRr, and dielectric substrates 101 and 102. The transmitter electrode PX1 and the receiver electrode PR1 constitute a first electrode pair in which an object to be detected such as paper can be inserted between the electrodes. The transmitter electrode PXr and the receiver electrode PRr constitute a pair of reference electrodes.

Specifically, the transmitter electrodes PX1 and PXr are arranged on one main surface of the dielectric substrate 101. The receiver electrodes PR1 and PRr are arranged facing the transmitter electrodes PX1 and PXr at a predetermined distance d on the main surface of the dielectric substrate 102 arranged facing the dielectric substrate 101. Here, the first electrode pair and the reference electrode pair are arranged adjacently to each other to such an extent that the effect of electric field can be ignored. The dielectric substrates 101 and 102 are, for example, glass-epoxy substrates.

An electrostatic capacitance C1 is formed between the transmitter electrode PX1 and the receiver electrode PR1. An electrostatic capacitance Crf is formed between transmitter electrode PXr and receiver electrode PRr.

In FIG. 3, a space area into which an object to be detected such as paper can be inserted is formed between the transmitter electrode PX1 and the receiver electrode PR1. Hereinafter, the case where the object to be detected is the paper (sheet) P1 will be exemplified. On the other hand, no object to be detected such as paper is inserted between the transmitter electrode PXr and the receiver electrode PRr.

Figure 4:
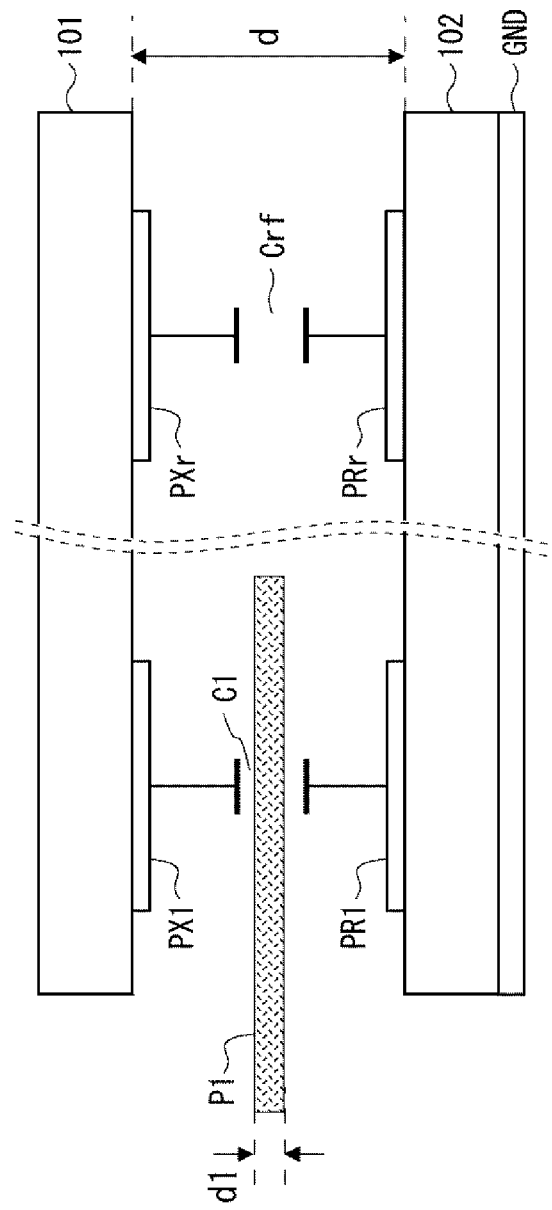
FIG. 4 is a schematic cross-sectional view showing a state in which a paper is inserted between the electrodes of electrode device shown in FIG. 3.

FIG. 4 is a schematic cross-sectional view showing a condition in which the paper P1 is inserted between the electrodes PX1 and PR1 of the electrode device 11. As shown in FIG. 4, if the thickness of the paper is d1 (<d), the paper P1 differing in dielectric constant from air is inserted in the area corresponding to the thickness d1 in the space area of the distance d between the electrodes PX1 and PR1 instead of air. As a result, the capacitance value of the electrostatic capacitance C1 between the electrodes PX1 and PR1 changes.

Here, assuming that the thickness of the paper P1 is 90 μm and the dielectric constant of the paper P1 is twice the dielectric constant of the air, the change in the capacitance value of the electrostatic capacitance C1 due to the paper P1 being inserted between the electrodes PX1 and PR1 is equivalent to the change in the capacitance value of the electrostatic capacitance C1 when the distance d between the electrodes is shortened by 45 µm. That is, the capacitance value of the electrostatic capacitance C1 formed between the electrodes PX1 and PR1 is not limited to the case where the paper P1 is inserted between the electrodes PX1 and PR1, and changes even when the distance d between the electrodes fluctuates.

On the other hand, the capacitance value of the electrostatic capacitance Crf formed between the electrodes PXr and PRr does not change when the paper P1 is inserted between the electrodes PX1 and PR1, but changes together with the capacitance value of the electrostatic capacitance C1 when the distance d between the electrodes changes.

Therefore, the change in the capacitance value of the electrostatic capacitance C1 caused by inserting the paper P1 between the electrodes PX1 and PR1 can be obtained by subtracting the capacitance value of the electrostatic capacitance Crf from the capacitance value of the electrostatic capacitance C1 and removing the variation component of the electrostatic capacitance C1 caused by the variation in the distance d between the electrodes.

Thus, the electrode device 21 according to the present embodiment includes a first electrode pair capable of insertion paper P1 between the electrodes and a corresponding reference electrode pair. Here, by subtracting the capacitance value of the electrostatic capacitance Crf of the reference electrode pair from the capacitance value of the electrostatic capacitance C1 of the first electrode value, the variation components of the electrostatic capacitance C1 due to the variation of the inter-electrode distance d are removed. Therefore, the sensor using the electrode device 21 can accurately detect whether or not the paper P1 is inserted between the electrodes PX1 and PR1 by calculating the change of the electrostatic capacitance C1 based on the difference between the consumption current values when electric field is generated in each of the first electrode pair and the reference electrode pair. The sensor using the electrode device 21 can also determine the material of the paper P1 inserted between the electrodes PX1 and PR1 in accordance with the improvement of the detecting accuracy.

Explanation of the Sensor System SYS2 With the Electrode Device 21

Figure 5:
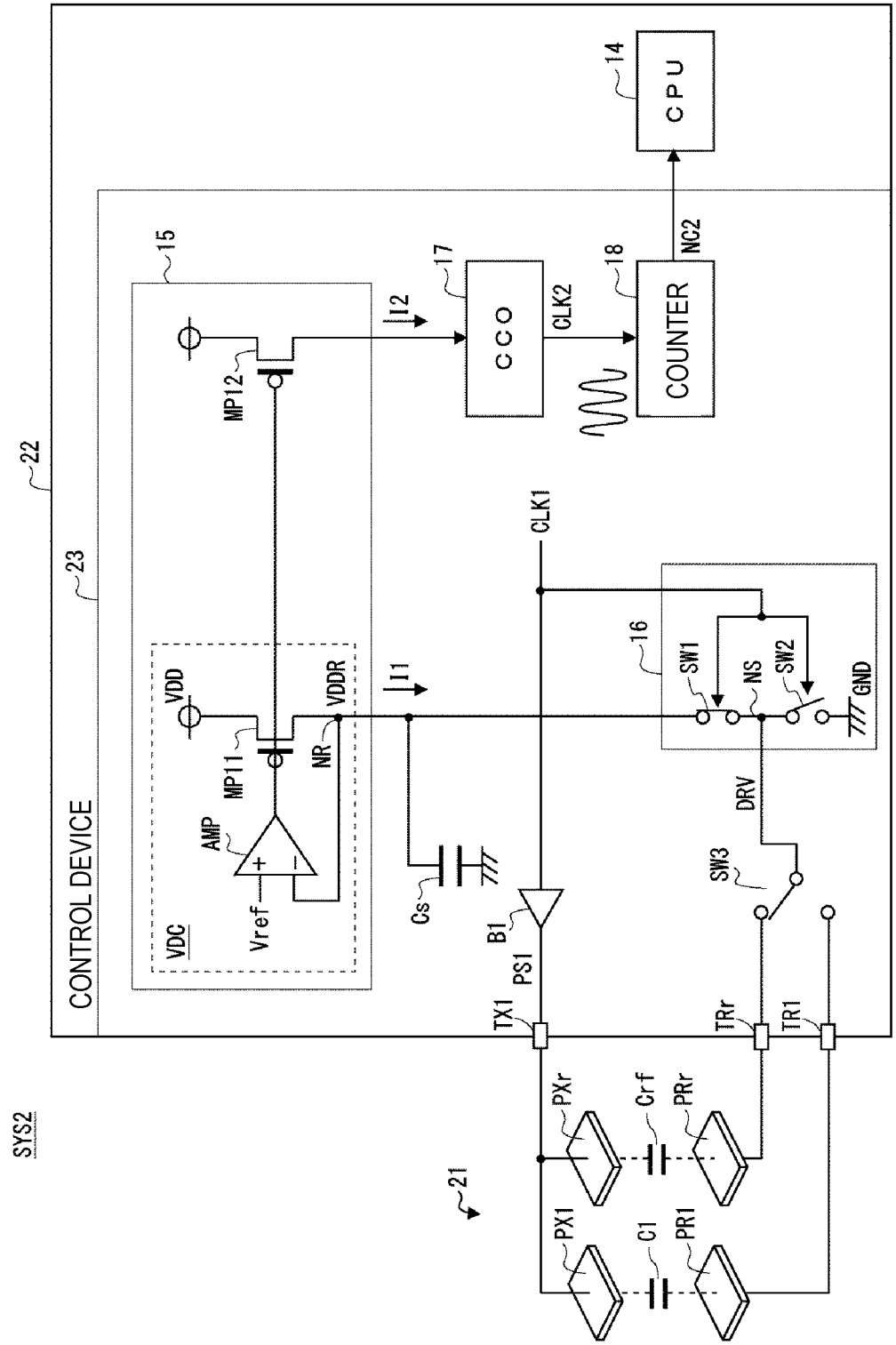
FIG. 5 is a diagram showing a configuration example of a semiconductor system with an electrode device shown in FIG. 3.

An explanation of the sensor system SYS2 with the electrode device 21 is followed. FIG. 5 is a diagram showing an exemplary configuration of a sensor system (semiconductor system) SYS2 including the electrode device 21.

As shown in FIG. 5, the sensor system SYS2 includes an electrode device 21 and a control device (semiconductor device) 22. The control device 22 includes a capacitance detector 23, an arithmetic processing unit (CPU) 14, and terminals TX1, TR1 and TRr. The transmitter electrode PX1 and PXr of the electrode device 21 are connected to the terminal TX1. The receiver electrode PR1 of the electrode device 21 is connected to the terminal TR1. The receiver electrode PRr of the electrode device 21 is connected to the terminal TRr.

Compared with the capacitance detection unit 13, the capacitance detection unit 23 includes only the buffer B1 out of the buffers B1 and B2, and further includes the switch circuit SW3. The switch circuit SW3 selectively outputs the driving pulse DRV outputted from the switch circuit 16 to either of the terminals TR1 and TRr.

The rest of the configuration of the capacitance detection unit 23 is the same as that of the capacitance detection unit 13, and therefore the description thereof is omitted.

Sensor System SYS2 Operation

Then the operation of the sensor system SYS2 is explained. First, the sensor system SYS2 measures the value of the current I1 (current value I1c) when electric field is generated between the transmitter electrode PX1 and the receiver electrode PR1 provided in the electrode device 21. At this time, the buffer B1 outputs the clock signal CLK1 to the terminal TX1 as the pulse signal PS1. As a result, the pulse signal PS1 is applied to the transmitter electrode PX1. The switch circuit SW3 outputs the driving pulse DRV outputted from the switch circuit 16 toward the terminal TR1. As a result, the driving pulse DRV are applied to the receiver electrode PR1. Therefore, electric field occurs between the transmitter electrode PX1 and the receiver electrode PR1.

The change in the electrostatic capacitance C1 due to the paper P1 being inserted between the transmitter electrode PX1 and the receiver electrode PR1 or the unintentional change in the distance d between the electrodes appears as a change in the integral of the current I1 (I1c).

The current-controlled oscillation circuit 17 outputs a clock signal CLK2 having a frequency corresponding to the current I2 proportional to the current I1. The counter 18 counts the number of oscillations of the clock signal CLK2 per predetermined period, and outputs a count value NC2.

The arithmetic processing unit 14 calculates the value of the current I1 (i.e., the current value I1c) when electric field is generated between the transmitter electrode PX1 and the receiver electrode PR1 based on the count value NC2 at this time.

Next, the sensor system SYS2 measures the value of the current I1 (current value I1r) when electric field is generated between the transmitter electrode PXr and the receiver electrode PRr provided in the electrode device 21. At this time, the buffer B1 outputs the clock signal CLK1 to the terminal TX1 as the pulse signal PS1. As a result, the pulse signal PS1 is applied to the transmitter electrode PXr. The switch circuit SW3 outputs the driving pulse DRV outputted from the switch circuit 16 to the terminal TRr. As a result, the driving pulse DRV are applied to the receiver electrode PRr. Therefore, electric field occurs between the transmitter electrode PXr and the receiver electrode PRr.

Here, a change in the electrostatic capacitance Crf due to an unintentional change in the inter-electrode distance d appears as a change in the integral of the current I1 (I1r).

The current-controlled oscillation circuit 17 outputs a clock signal CLK2 having a frequency corresponding to the current I2 proportional to the current I1. The counter 18 counts the number of oscillations of the clock signal CLK2 per predetermined period, and outputs a count value NC2.

The arithmetic processing unit 14 calculates the value of the current I1 (i.e., the current value I1r) when electric field is generated between the transmitter electrode PXr and the receiver electrode PRr based on the count value NC2 at this time.

Thereafter, the arithmetic processing unit 14 subtracts the current value I1r from the current value I1c to remove the variation components of the current value caused by the unintended variation of the inter-electrode distance d. Here, the change in the capacitance value of the electrostatic capacitance C1 becomes clear from the change in the current value I1c-I1r. Therefore, the arithmetic processing unit 14 can calculate the amount of change in the capacitance value of the electrostatic capacitance C1, which changes as the paper P1 is inserted between the electrodes PX1 and PR1, from the amount of change in the current value I1c-I1r. In other words, the arithmetic processing unit 14 can accurately detect whether or not the paper P1 is inserted between the electrodes PX1 and PR1 based on the amount of change in the current value I1c-I1r. The arithmetic processing unit 14 can also determine the material of the paper P1 inserted between the electrodes PX1 and PR1 in accordance with the improvement in the detecting accuracy.

Thus, the electrode device 21 according to the present embodiment comprises a first electrode pair in which the paper P1 can be inserted between the electrodes, and a corresponding reference electrode pair. Then, the sensor system SYS2 calculates the amount of change in the capacitance value of the electrostatic capacitance C1 based on the difference between the consumption current value I1c when electric field is generated in the first electrode pair and the consumption current value I1r when electric field is generated in the reference electrode pair. Thereby, the sensor system SYS1 can remove the variation components of the electrostatic capacitance C1 caused by the unintentional variation of the inter-electrode distance d, and therefore, it is possible to accurately detect whether or not the paper P1 is inserted between the electrodes PX1 and PR1. The control device 12 can also determine the material of the paper P1 inserted between the electrodes PX1 and PR1.

In the present embodiment, the pulse signal applied to the transmitter electrode PX1 and the driving pulse DRV applied to the receiver electrode PR1 have opposite phases, but the present invention is not limited thereto. The pulse signal applied to the transmitter electrode PX1 and the drive pulse DRV applied to the receiver electrode PR1 may be in-phase. Alternatively, the difference between the current value I1c in each of the reverse phase and the in-phase and the difference between the current value I1r in each of the reverse phase and the in-phase may be used for measuring the amount of change in the capacitance value of the electrostatic capacitance C1. As a result, the fluctuation components of the idle currents included in the currents I1c and I1r are canceled out, so that the measurement accuracy of the change amounts of the capacitance values of the electrostatic capacitance C1 is improved.

In present embodiment, the case where the consumption current value I1c when electric field is generated in the first electrode pair and the consumption current value I1r when electric field is generated in the reference electrode pair are measured alternately has been described, but the present invention is not limited to this case. By separately providing a current supply path for the first electrode pair and a current supply path for the reference electrode pair, the consumption current values I1c, I1r may be measured in parallel.

In the present embodiment, the case where the control device 22 measures the consumption current value when electric field is generated between the electrodes PX1 and PR1, and the consumption current value when electric field is generated between the electrodes PXr and PRr, and calculates the change amount of the capacitance value of the electrostatic capacitance C1 from the measurement result has been described, but the case is not limited to this. For example, the control device 22 may be configured to measure the inter-electrode voltage when electric field is generated between the electrodes PX1 and PR1, and the inter-electrode voltage when electric field is generated between the electrodes PXr and PRr, and calculate the change amount of the capacitance value of the electrostatic capacitance C1 from the measurement result.

Further, in the present embodiment, the control device 22 detects whether the paper P1 is inserted between the electrodes PX1 and PR1 of the electrode device 21, but the present invention is not limited thereto. The control device 22 may also detect touches to the electrode PX1 or electrode PR1 that cause variations in the distance d between the electrodes PX1 and PR1 of the electrode device 21. However, in this instance, the electrode device 21 needs to be configured so that the distance between the electrode PXr and the electrode PRr does not vary depending on touching of the electrode PX1 or the electrode PR1.

A First Modification of the Second Embodiment

Figure 6:
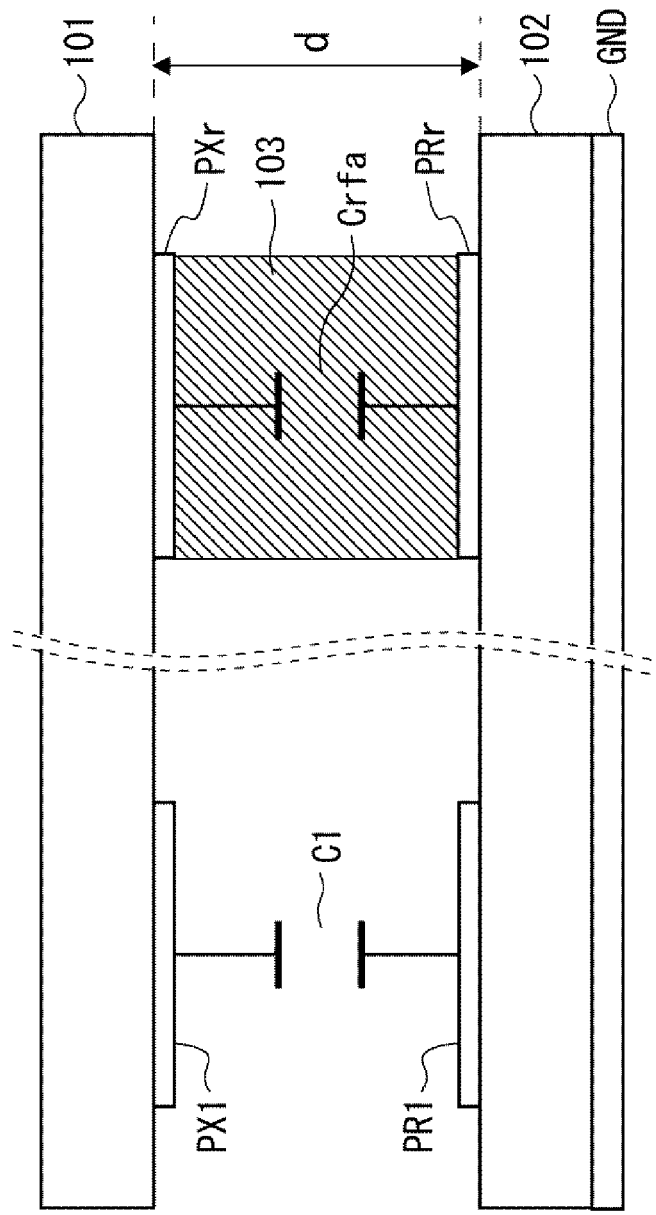
FIG. 6 is a cross-sectional schematic view showing a first modified example of electrode device shown in FIG. 3.

FIG. 6 is a schematic cross-sectional view showing a first modification of the electrode device 21 as an electrode device 21a. As shown in FIG. 6, compared with the electrode device 21, the electrode device 21a includes the solid-state dielectric layer 103 instead of the space area between the electrodes of the reference electrode pair. The rest of the structure of the electrode device 21a is the same as the structure of the electrode device 21, and therefore the description thereof is omitted.

The electrode device 21a can prevent the paper P1 from being inserted between the electrodes of the reference electrode pair by providing the solid-state dielectric layer 103 between the electrodes of the reference electrode pair.

A Second Modification of the Second Embodiment

Figure 7:
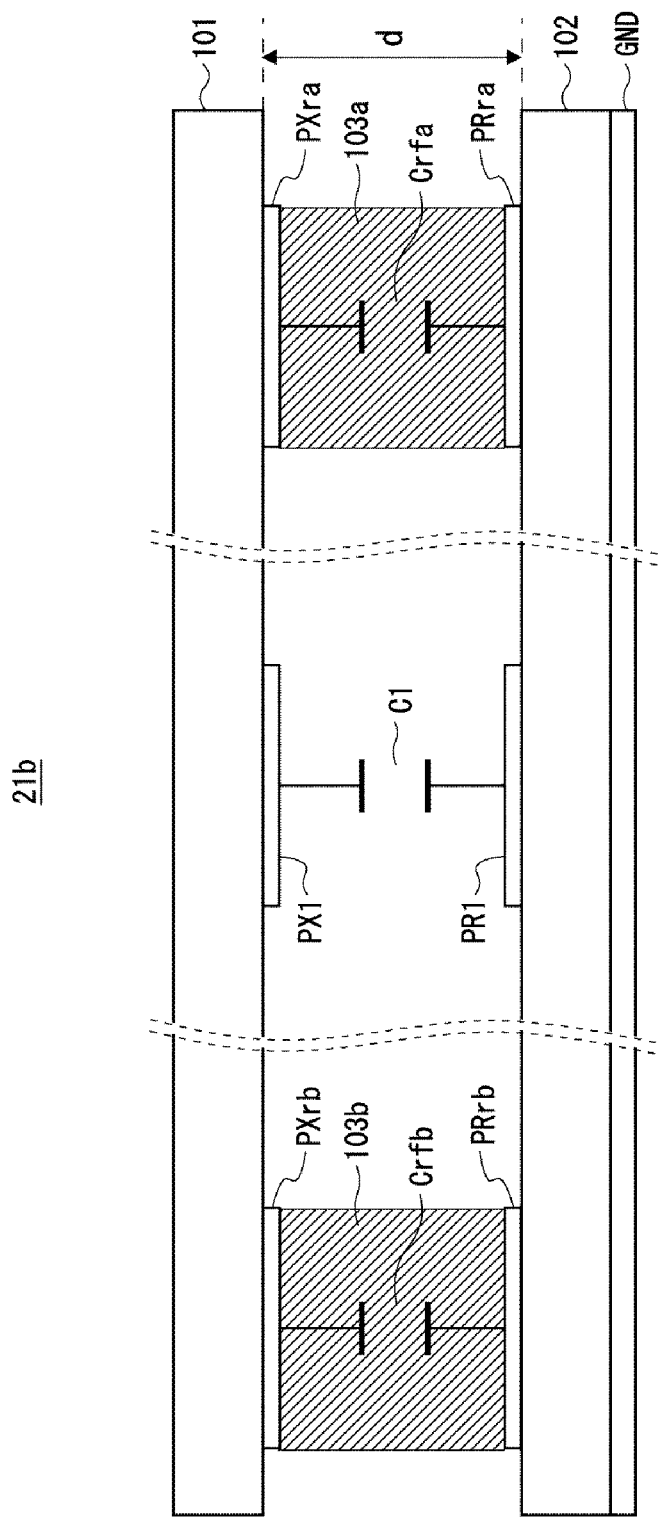
FIG. 7 is a cross-sectional schematic view showing a second modified example of electrode device shown in FIG. 3.

FIG. 7 is a schematic cross-sectional view showing a second modification of the electrode device 21 as an electrode device 21b. As shown in FIG. 7, compared with the electrode device 21a, the electrode device 21b includes two pairs of reference electrodes instead of a pair of reference electrodes.

The first reference electrode pair includes electrodes PXra and PRra corresponding to the electrodes PXr and PRr, and a dielectric layer 103a corresponding to the dielectric layer 103. The second reference electrode pair includes electrodes PXrb and PRrb corresponding to the electrodes PXr and PRr, and a dielectric layer 103b corresponding to the dielectric layer 103.

The first and second pairs of reference electrodes are arranged so as to sandwich, for example, a region into which the paper P1 is inserted. The rest of the structure of the electrode device 21b is the same as the structure of the electrode device 21, and therefore the description thereof is omitted.

The electrode device 21b is as effective as the electrode device 21a. In addition, the electrode device 21b can suppress a bias in variation of the distance between the electrodes of the first electrode pair and the distance between the electrodes of the first and second reference electrode pairs.

Third Embodiment

Figure 8:
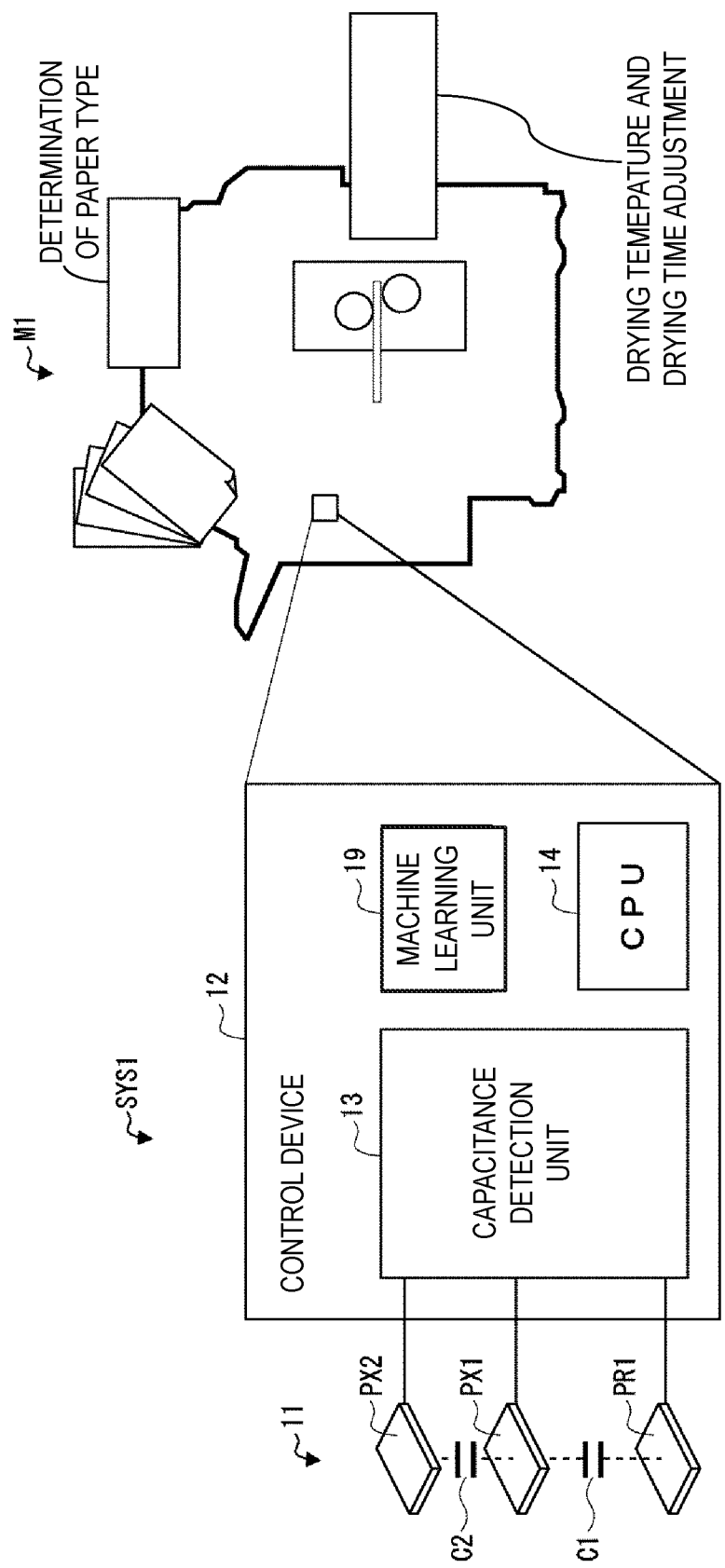
FIG. 8 is a diagram showing an application example of semiconductor system according to the first embodiment.

Present embodiment describes an application example of a sensor system SYS1. FIG. 8 is a diagram showing an application example of the sensor system SYS1. In FIG. 8, the sensor system SYS1 is applied to the copying machine M1. In FIG. 8, the control device 22 further includes a machine learning unit 19.

The machine learning unit 19 machine-learns the difference in the detection result outputted from the capacitance detection unit 13 according to the type of paper P1 used in the copying machine M1, for example. The arithmetic processing unit 14 instructs the various device to perform a process according to the type of the paper P1 predicted from the result of learning by the machine learning unit 19.

Here, the dielectric constant of the paper P1 changes according to the moisture content. Therefore, when the type of the paper P1 used in the copying machine M1 is determined, the arithmetic processing unit 14 can estimate the moisture content of the paper P1 from the dielectric constant of the paper P1 used in the copying machine M1. Based on the estimated values, the arithmetic processing unit 14 instructs the heaters mounted on the copying machine M1, for example, of the drying temperatures and the drying times of the papers P1. As a result, the occurrence of the curl phenomenon of the paper P1 is appropriately suppressed, so that the paper jam or the like of the copying machine M1 is eliminated.

In the present embodiment, the sensor system SYS1 is applied to the copying machine M1, but the present invention is not limited thereto. Of course, the sensor system SYS2 may be applied to the copying machine M1.

Although the invention made by the inventor has been specifically described based on the embodiment, the present invention is not limited to the embodiment already described, and it is needless to say that various modifications can be made without departing from the gist thereof.

For example, in the above-described embodiment according to semiconductor device, the conductivity type (p-type or n-type) of the semiconductor substrate, the semiconducting layer, the diffusion layer (diffusion area), or the like may be inverted. Therefore, in the case where one of the conductivity types of the n-type or the p-type is the first conductivity type and the other conductivity type is the second conductivity type, the first conductivity type can be the p-type and the second conductivity type can be the n-type, or on the contrary, the first conductivity type can be the n-type and the second conductivity type can be the p-type.

Part or all of the above embodiments may be described as the following additional statement, but the present invention is not limited thereto.

(Additional statement 1) An electrode device for use in capacitance detection of a mutual capacitance type comprising:
a first electrode pair that allows an object to be detected to be arranged; and
a reference electrode pair provided corresponding to the first electrode pair, wherein the first electrode pair has a first transmitter electrode and a first receiver electrode arranged to face the first transmitter electrode with a predetermined interval therebetween, and
wherein the reference electrode pair includes:
a second transmitter electrode arranged on a first substrate, the first transmitter electrode being arranged on the substrate; and
a second receiver electrode arranged on a second substrate to face the second transmitter electrode with the predetermined interval therebetween, the first transmitter electrode being arranged on the second substrate.

(Additional statement 2) The electrode device according to additional statement 1, wherein a space area in which the object can be inserted is formed between the first transmitter electrode and the first receiver electrode in the first electrode pair.

(Additional statement 3) The electrode device according to additional statement 2, wherein it is determined whether or not the object has been inserted between the first transmitter electrode and the first receiver electrode, based on a calculation result of capacitance between the first transmitter electrode and the first receiver electrode, the calculation result of capacitance being calculated by using a difference between a consumption current value when a first electric field is generated between the first transmitter electrode and the first receiver electrode, and a consumption current value when a second electric field is generated between the second transmitter electrode and the second receiver electrode.

(Additional statement 4) The device according to additional statement 2, wherein the object to be detected is paper.

(Additional statement 5) The electrode device according to additional statement 1, wherein the presence or absence of contact of the object causing a variation of distance between the first transmitter electrode and the first receiver electrode is determined based on a calculation result of capacitance between the first transmitter electrode and the first receiver electrode, the calculation result being calculated by using difference between the consumption current value when a first electric field is generated between the first transmitter electrode and the first receiver electrode and the consumption current value when a second electric field is generated between the second transmitter electrode and the second receiver electrode.

(Additional statement 6) The electrode device according to additional statement 1, wherein the reference electrode pair is disposed adjacently to the first electrode pair.

(Additional statement 7) The electrode device according to additional statement 1, wherein the reference electrode pair further comprises a solid-state dielectric layer formed between the second transmitter electrode and the second receiver electrode.

(Additional statement 8) The electrode device according to additional statement 7,
wherein the reference electrode pair comprises a first and a second reference electrode pair, and
wherein the first electrode pair is provided between the first reference electrode pair and the second reference electrode pair.

(Additional statement 9) A semiconductor system comprising:
an electrode device; and
a semiconductor device,
wherein the electrode device comprises:
a first electrode pair including a first transmitter electrode and a first receiver electrode arranged to face the first transmitter electrode at a predetermined interval; the first electrode pair being configured to be disposed by an object to be detected;
a first reference electrode pair including
a second transmitter electrode arranged on a first substrate; the first transmitter electrode being arranged on the first substrate, and
a second receiver electrode arranged on a second substrate and opposed to the second transmitter electrode at a predetermined interval; the first receiver being arranged on the second substrate
wherein the semiconductor device comprises:
a pulse signal output circuit for outputting a pulse signal to each of the first transmitter electrode and the second transmitter electrode;
a capacitance detection circuit for calculating a change amount of a capacitance between the first transmitter electrode and the first receiver electrode; the change amount of a capacitance being calculated based on a current consumed at the first receiver electrode when the pulse signal is applied to the first transmitter electrode, and a current consumed at the second receiver electrode when the pulse signal is applied to the second transmitter electrode, and an arithmetic processing unit for determining whether or not the object has been disposed on the first electrode pair of the electrode device based on a detection result of the capacitance detection circuit.

(Additional statement 10) The semiconductor system according to additional statement 9,
wherein a space area in which the object can be inserted is formed between the first transmitter electrode and the first receiver electrode, and
wherein the arithmetic processing unit is configured to determine whether or not the object has been inserted between the first transmitter electrode and the first receiver electrode based on the detection result of the capacitance detection circuit.

(Additional statement 11) The semiconductor system according to additional statement 9, wherein the arithmetic processing unit is configured to determine the presence or absence of a touch of the object causing a variation of distance between the first transmitter electrode and the first receiver electrode, based on the detection result of the capacitance detection circuit.

(Additional statement 12) The semiconductor system according to additional statement 9, wherein the arithmetic processing unit is configured to determine whether or not the object is disposed on the first electrode pair of the electrode device, and to determine a process for the object based on the determining whether or not the object is disposed on the first electrode pair of the electrode device (Additional statement 13) The semiconductor system according to additional statement 12, further comprising a machine learning unit for machine learning a difference in detection results of the capacitance detection circuits according to a type of the object, wherein the arithmetic processing unit is configured to determine a process for the object according to a type of the object; the process being predicted from a learning result by the machine learning unit.

(Additional statement 14) An electrode device for use in capacitance detection of a mutual capacitance type comprising:
a receiver electrode;
a first transmitter electrode disposed to face the receiver electrode;
a second transmitter electrode disposed opposite to the receiver electrode with the first transmitter electrode interposed therebetween; and
a dielectric substrate provided between the first transmitter electrode and the second transmitter electrode to fix distance and dielectric constant between the first transmitter electrode and the second transmitter electrode.

(Additional statement 15) The electrode device according to additional statement 14, wherein a space area in which an object to be detected can be inserted is formed between the first transmitter electrode and the receiver electrode.

(Additional statement 16) The electrode device according to additional statement 15,
wherein a value converted into a distance between the first transmitter electrode and the receiver electrode is calculated based on a calculation result of a capacitance between the first transmitter electrode and the receiver electrode calculated by using a consumption current value when a first electric field is generated between the first transmitter electrode and the receiver electrode, and a consumption current value when a second electric field is generated between the second transmitter electrode and the receiver electrode including the dielectric substrate, and
wherein whether or not the detection object has been inserted between the first transmitter electrode and the receiver electrode is determined, or a material of the object is specified, from a calculation result of the value converted into the distance between the first transmitter electrode and the receiver electrode.

What is claimed is:

1. An electrode device for use in capacitance detection of a mutual capacitance type comprising:
a receiver electrode;
a first transmitter electrode disposed opposite to the receiver electrode;
a second transmitter electrode disposed opposite to the receiver electrode with the first transmitter electrode interposed therebetween; and
a dielectric substrate provided between the first transmitter electrode and the second transmitter electrode and configured to fix a distance and a dielectric constant between the first transmitter electrode and the second transmitter electrode,
wherein a space area in which an object to be detected is inserted is formed between the first transmitter electrode and the receiver electrode, and
wherein it is determined whether or not the object to be detected is inserted between the first transmitter electrode and the receiver electrode based on a calculation result of the capacitance between the first transmitter electrode and the receiver electrode, the calculation result being calculated by using a first consumption current value when a first electric field is generated between the first transmitter electrode and the receiver electrode, and a second consumption current value when a second electric field is generated between the second transmitter electrode and the receiver electrode.

2. The electrode device according to claim 1, wherein the object to be detected is a paper.

3. The electrode device according to claim 1, wherein it is determined whether the presence or absence of a contact of an object to be detected causing a variation in a distance between the first transmitter electrode and the receiver electrode based on a calculation result of the capacitance; the calculation result being calculated by using a first consumption current value when a first electric field is generated between the first transmitter electrode and the receiver electrode, and a second consumption current value when a second electric field is generated between the second transmitter electrode and the receiver electrode.

4. The device according to claim 1, wherein the dielectric substrate is a glass-epoxy substrate.

5. A semiconductor device comprising:
an electrode device including:
a receiver electrode;
a first transmitter electrode disposed to face the receiver electrode;
a second transmitter electrode disposed to face the receiver electrode with the first transmitter electrode interposed therebetween;
a dielectric substrate to fix a distance and a dielectric constant between the first transmitter electrode and the second transmitter electrode, the dielectric substrate being provided between the first transmitter electrode and the second transmitter electrode,
a pulse signal output circuit configured to output a pulse signal selectively to any of the first transmitter electrode and the second transmitter electrode,
a capacitance detection circuit that calculates a change in capacitance between the first transmitter electrode and the receiver electrode based on a first consumption current consumed by the receiver electrode when the pulse signal is applied to the first transmitter electrode, and a second consumption current consumed by the receiver electrode when the pulse signal is applied only to the second transmitter electrode; and an arithmetic processing unit that determines whether a detected target has been disposed on the electrode device based on a detection result by the capacitance detection circuit.

6. The semiconductor device according to claim 5, wherein a space area in which an object to be detected is inserted is formed between the first transmitter electrode and the receiver electrode, and wherein the arithmetic processing unit determines whether the object has been inserted between the first transmitter electrode and the receiver electrode based on a detection result obtained by the capacitance detection circuit.

7. The semiconductor device according to claim 5, wherein the arithmetic processing unit determines whether or not the object is touched, which causes a variation of a distance between the first transmitter electrodes and the receiver electrodes, based on a detection result obtained by the capacitance detection circuit.

8. The semiconductor device according to claim 5, wherein the pulse signal output circuit is configured to set the first transmitter electrode to a high-impedance state when outputting the pulse signal to the second transmitter electrode.

9. The semiconductor device according to claim 5, wherein the pulse signal output circuit is configured to set the second transmitter electrode to a high-impedance state when outputting the pulse signal to the first transmitter electrode.

10. The semiconductor device according to claim 5, wherein the pulse signal output circuit is configured to output the pulse signal to the second transmitter electrode in addition to the first transmitter electrode when the pulse signal is output to the first transmitter electrode.

11. The semiconductor device according to claim 5,
wherein the pulse signal output circuit is configured to output the pulse signal according to a first clock signal,
wherein the capacitance detection circuit includes:
a constant voltage generation circuit for generating a constant voltage;
a switch circuit for switching between applying the constant voltage to the receiver electrode and discharging an accumulated charge in the receiver electrode based on the first clock signal;
a current-controlled oscillation circuit for generating a second clock signal having a frequency according to a current flowing from the constant voltage generation circuit to the switch circuit when the constant voltage is applied to the receiver electrode; and
a counter for counting a number of oscillations per a predetermined period of the second clock signal, and
wherein the arithmetic processing unit is configured to determine whether or not the object is disposed on the electrode device based on a count value of the counter.

12. A semiconductor system comprising:
an electrode device; and
a semiconductor device,
wherein the electrode device includes:
a receiver electrode;
a first transmitter electrode disposed opposite to the receiver electrode;
a second transmitter electrode disposed opposite to the receiver electrode with the first transmitter electrode interposed therebetween; and
a dielectric substrate for fixing a distance and dielectric constant between the first transmitter electrode and the second transmitter electrode,
wherein the semiconductor device includes:
a pulse signal output circuit for outputting a pulse signal selectively to any of the first transmitter electrode and the second transmitter electrode;
a capacitance detection circuit for calculating an amount of change of capacitance between the first transmitter electrode and the receiver electrode, based on a first current consumed in the receiver electrode when the pulse signal is applied to the first transmitter electrode, and a second current consumed in the receiver electrode when the pulse signal is applied only to the second transmitter electrode
an arithmetic processing unit for determining whether or not an object to be detected is disposed on the electrode device, based on a detection result by the capacitance detection circuit.

13. The semiconductor system according to claim 12,
wherein a space region in which the object to be detected is inserted is formed between the first transmitter electrode and the receiver electrode, and
wherein the processing unit is configured to determine whether or not the object has been inserted between the first transmitter electrode and the receiver electrode based on the detection result by the capacitance detection circuit.

14. The semiconductor system according to claim 12, wherein the arithmetic processing unit is configured to determine, based on a detection result by the capacitance detection circuit, the presence or absence of contact of the object causing a variation of the distance between the first transmitter electrode and the receiver electrode.

15. The semiconductor system according to claim 12, wherein the pulse signal output circuit is configured to set the first transmitter electrode to a high impedance state when outputting the pulse signal to the second transmitter electrode.

16. The semiconductor system according to claim 12, wherein the pulse signal output circuit is configured to set the second transmitter electrode to a high impedance state when outputting the pulse signal to the first transmitter electrode.

17. The semiconductor device according to claim 12, wherein the arithmetic processing unit is configured to determine a determination result whether or not the object has been disposed on the electrode device, and to determine processing for the object based on the determination result.

18. The semiconductor system according to claim 17 further comprising:
a machine learning circuit for machine learning a difference in detection result of the capacitance detection circuit according to a type of the object; and
the arithmetic processing unit is configured to determine a process for the object according to the type of the object; the process being predicted from a learning result by the machine learning unit.

* * * * *